US011195004B2

(12) United States Patent
Panakkal

(10) Patent No.: US 11,195,004 B2
(45) Date of Patent: Dec. 7, 2021

(54) METHOD AND SYSTEM FOR EXTRACTING INFORMATION FROM DOCUMENT IMAGES

(71) Applicant: UST Global (Singapore) Pte. Ltd., Singapore (SG)

(72) Inventor: Rahul Panakkal, Aliso Viejo, CA (US)

(73) Assignee: UST Global (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/722,790

(22) Filed: Dec. 20, 2019

(65) Prior Publication Data

US 2021/0042516 A1   Feb. 11, 2021

(30) Foreign Application Priority Data

Aug. 7, 2019   (IN) .............................. 201911032007

(51) Int. Cl.
*G06K 9/00* (2006.01)
*G06K 9/62* (2006.01)
*G06K 9/20* (2006.01)

(52) U.S. Cl.
CPC ..... *G06K 9/00456* (2013.01); *G06K 9/00469* (2013.01); *G06K 9/2054* (2013.01); *G06K 9/6267* (2013.01); *G06K 2209/01* (2013.01)

(58) Field of Classification Search
CPC .......... G06K 9/00456; G06K 9/00469; G06K 9/2054; G06K 9/6267; G06K 2209/01
USPC .................................................. 382/159, 195
See application file for complete search history.

(56) References Cited

U.S. PATENT DOCUMENTS

| 2007/0065003 | A1* | 3/2007 | Kellerman | ........... G06K 9/6835 |
| | | | | 382/159 |
| 2013/0251211 | A1* | 9/2013 | Palm | ................... G06K 9/00456 |
| | | | | 382/112 |
| 2019/0303663 | A1* | 10/2019 | Krishnapura Subbaraya | ............... |
| | | | | G06K 9/00449 |
| 2020/0019767 | A1* | 1/2020 | Porter | ................... G06K 9/6202 |

* cited by examiner

*Primary Examiner* — Daniel G Mariam
(74) *Attorney, Agent, or Firm* — Nixon Peabody LLP

(57) ABSTRACT

A system and method to extract data from regions of interest on a document is disclosed. A storage device stores an image derived from a document having text information. A region of interest identification engine scans the image and identifies at least one region of interest on the image. An optical character recognition module is operable to convert image data in the region of interest to machine readable data. A classification engine classifies the data obtained by the optical character recognition module from the region of interest.

14 Claims, 8 Drawing Sheets

500

502

SAMPLE INVOICE 2, Inc.

PURCHASE ORDER

| Date: | 11/11/2015 |
|---|---|
| PO# | LD-88888 |
| Ship Via: | Ground |
| Deliver on: | 11/12/2015 |
| Reg. by: | EM |

504
506
508

518 — Job #: SHOP  Shop

SHOP STOCK COP PIPE

| Vendor |
|---|
| ABC Enterprises |
| P.O. Box 000000 |
| City Name, ST 00000-0000 |
| Phone: (000) 000-0000 |
| Fax: |

512

| Ship to |
|---|
| DEF, Inc |
| 000 Abcdef Drive |
| Zxovg Hjda, ST 99999 |

514

TAG: SHOP STOCK XNJLS

516
520

| Qty | UM | Item No | Description | Unit Price | Amount |
|---|---|---|---|---|---|
| 500.00 | FT | LHARDD20 | 1/2X20 L HARD TUBE | 0.96 | 479.15 |
| 500.00 | FT | LHARDF20 | 3/4X20 L HARD TUBE | 1.54 | 771.45 |
| 300.00 | FT | LHARDG20 | 1X20 L HARD TUBE | 2.88 | 862.80 |

522

| Subtotal: | 2,113.40 |
|---|---|
| Tax: | 147.94 |
| Total: | 2,261.34 |

Please send Email Confirmation – Thank you!

METHOD AND SYSTEM FOR EXTRACTING INFORMATION FROM DOCUMENT IMAGES

PRIORITY CLAIM

This application claims priority to Indian Provisional Application No. 201911032007, filed Aug. 7, 2019. That application in its entirety is hereby incorporated by reference.

TECHNICAL FIELD

The present disclosure relates generally to a data extraction system, and more specifically, to a method and system to allow efficient extraction of specific information from scanned documents such as invoices.

BACKGROUND

There is an increasing need to easily obtain data from scanned images of documents. For example, many documents such as invoices are still in paper form, but must be converted to electronically accessible form. In order to access the data electronically, manual labor must be employed to key in data from physical documents or images of such documents. Such methods are time consuming and may suffer from accuracy due to human error in keying in data.

With the advent of optical character recognition (OCR) technology, text data may be translated automatically from text images on scanned documents. However, all data on a document image, including irrelevant data, will be produced by an OCR process. Thus, human intervention is still required to properly determine relevant data from the OCR produced data. When such data is extracted and cleaned up after the OCR process, a text search from the extracted data may be performed to determine the relevant data. This process is also error prone because the OCR cannot properly format data that is oriented in anything but horizontal lines in a document.

For example, many companies receive scanned copies of different types of invoices, which prevents them from using a normal text search to extract information. Because each vendor invoice has a different template and layout, the information will be present in different locations or regions on the scanned document. For example, two different invoices may have the same information, but such details like the invoice number, the date, the total amount, etc. are in different locations on the document. Thus, pre-defined rules cannot be used to reliability extract information from invoices because of the differences in format. Moreover, certain information may be aligned horizontally and vertically in meaningful ways to a human, but for a machine to differentiate whether to interpret the content along rows or columns or both is difficult to do as well as a human can. For example, a human might immediately recognize a mailing address, which is aligned vertically in 3-4 rows, and be able to differentiate such an address from an invoice number field, which is typically aligned horizontally in columnar form. The items ordered on the invoice are typically arranged in a tabular format, which means the content is aligned across both vertical and horizontal dimensions. Conventional machine learning techniques cannot adequately discriminate among these differently aligned data types, especially across multiple documents that have different templates and layouts, where the same content (e.g., address) appears in different locations on the document, and can have different labels or tags associated with the information (e.g., one invoice might refer to a job number, or job ID, or invoice ID, and the like). Moreover, certain documents such as invoices typically have multiple phone numbers and multiple addresses (the phone number of the procurer and the phone number of the provider), so the machine needs to be able to differentiate which phone number and address belongs to which party (provider or procurer of the goods/services).

Other solutions include current invoice extraction techniques used in the industry. However, such techniques cannot be applied to the majority of document types in a particular industry. For example, one solution is extracting data from a PDF document created from the original paper document. In order for this approach to work, it must be ensured that the invoice is in the form of a searchable PDF. Some pre-defined terms are then used to search within the PDF to find terms of interest.

This approach has two main drawbacks. First, the process excludes a large number of documents that are scanned or photographed as it is not possible to get text from an image. Applying an Optical Character Recognition (OCR) system to such document images will usually lose the spatial information, making it difficult to map values to terms. Second, because the search typically uses predefined terms, data labelled or tagged with non-standard terms on documents will not be extracted.

Another approach is use of a pre-defined template to assist in data extraction. Such a template is effective for data extraction, only if all the invoices follow the same document layout pattern. This approach is effective in situations when there is a need to parse large number of invoices from a single vendor. Unfortunately, this approach will not work if the invoices are from different vendors in different format than the template.

Thus, there lies at least a need for a system that allows efficient extraction of relevant data from a document image. There is also a need for a system that allows identification of regions of interest on a document for further classification. There is also a need for a system that employs machine learning to determine image features that define probable areas of a document containing needed information.

SUMMARY

One disclosed example is an invoice processing system which will help extract data from an invoice. The invoice can be a scanned image and can be in any format. This is especially useful in cases where the system is expected to process invoices from different vendors and hence cannot follow a standard format.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 5A is an image of a different example invoice document that includes information that may be extracted efficiently from the system in FIG. 1;

FIG. 5B is an image of the invoice in FIG. 5A with regions of interest identified for scanning.

Figure 1:
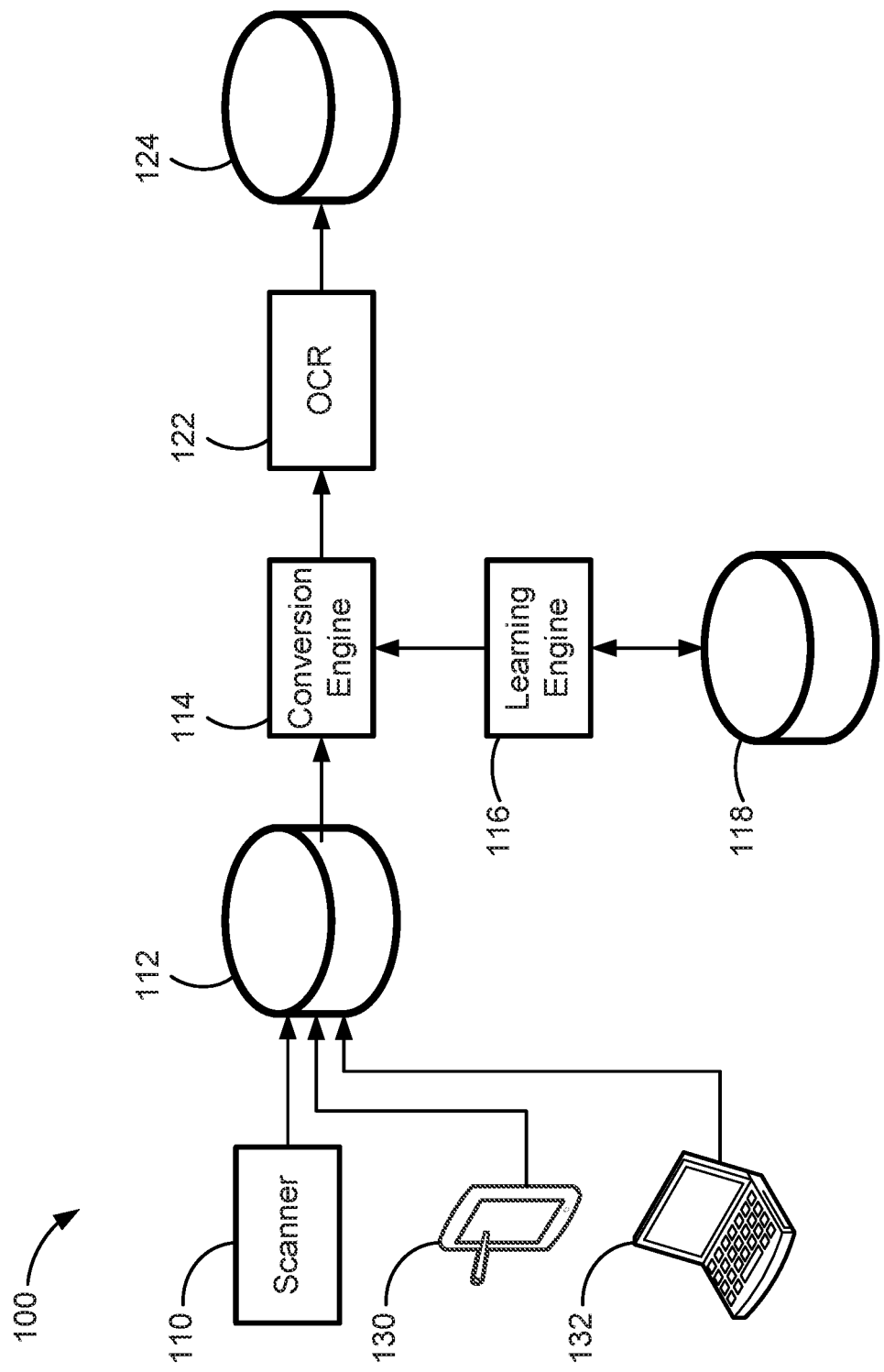
FIG. 1 is a block diagram of an example document data extraction system.

The present disclosure is susceptible to various modifications and alternative forms. Some representative embodiments are shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclose relates to a system that extracts key information from the image of any document such as an invoice. The system does not depend on reading the text in the image or the position of the text in the document so that the current challenges of extracting certain information from documents are overcome. While the examples disclosed herein focus on invoices, the present disclosure is not limited to invoices, but rather, is more broadly applicable to any documents having similarly arranged information as invoices, such as credit card agreements, and other documents having vertically and horizontally aligned information and information arranged in tables, and particularly where the information or content on the document appears in different positions and arrangements or layouts for different creators or authors of the documents.

The disclosed information extraction system mimics human behavior and understanding when parsing an image of a document such as an invoice. Specifically, the regions on the document where the information lies are identified first. There are several clues that will help understand these regions, which are learned based on past experience. Some of these clues include, but are not limited to, the layout of the text, boldness and italics, alignment of the text, etc. For example, as human beings, we have learned that there is a high probability that two short texts which are left aligned are related to one another.

In this example, the system is trained to follow human behavior in viewing a document for desired information. Specifically, regions of interest are first identified based on machine learning of characteristics of those regions. For example, a sufficiently large number of diverse invoices (e.g., from different vendors having a variety of formats and layouts of content) may be marked with multiple areas as regions of interest. These marked invoices are then fed to a deep learning system with a neural network so that it can learn the patterns that define a region of interest in invoices. Of course, such recognition may be learned for other types of documents such as credit card agreements, account statements, receipts etc The neural network looks for patterns that allow it to predict the regions of interest in different documents of the same type such as invoices. With a sufficiently large number of training documents, the system will be able to identify image patterns that define a region of interest in documents on its own, much the same way as a human does.

Once these regions of interest are identified, Optical Character Recognition (OCR) may be applied to the text images in the captured region to convert the images to computer readable data. Since OCR is applied only on the very small captured regions of interest, spatial information will be preserved. The smaller regions thus identified will have lesser spatial information to store. They will have at most, some line breaks and tab characters which would be captured by the OCR tools. Need to identify the other features like alignments etc. are eliminated by this approach. This helps TO identify what is the key data and its associated value in the document. Once the OCR process finishes converting the selected text in the regions of interest, various post-processing steps are performed that clean the output from the OCR. Various techniques such as spell check, pre-defined dictionaries, etc. are performed to achieve this. Once the cleaning is done, the result is presented as a convenient format such as JavaScript Object Notation (JSON) so that any downstream application can use it for further processing.

FIG. 1 shows an example document data extraction system 100. The system 100 allows the efficient extraction from information on different documents of the same type such as invoices issued by different vendors. The system 100 may include a scanner 110 that produces images of documents that are then stored in a storage server 112. The storage server 112 is coupled to a conversion engine 114. The conversion engine 114 receives a learned algorithm with appropriate weights to identify regions of interest from a document region of interest learning engine 116. The document region of interest learning engine 116 produces a model to identify regions of interest in the document image based on characteristics of the images learned from a training set of data 118.

An OCR/cleanup engine 120 obtains the document with the identified regions of interest and converts text images to text data from the identified regions of interest. The data is cleaned up and sent to populate a record in a sales database 122. Other sources of scanned documents may be used. For example, a mobile device such as a smart phone 130 may capture an image of a document by an onboard camera and wirelessly transmit the image to the storage server 112. Alternatively, image files may be transferred directly from a computing device 132 to the storage server 112.

Figure 2:
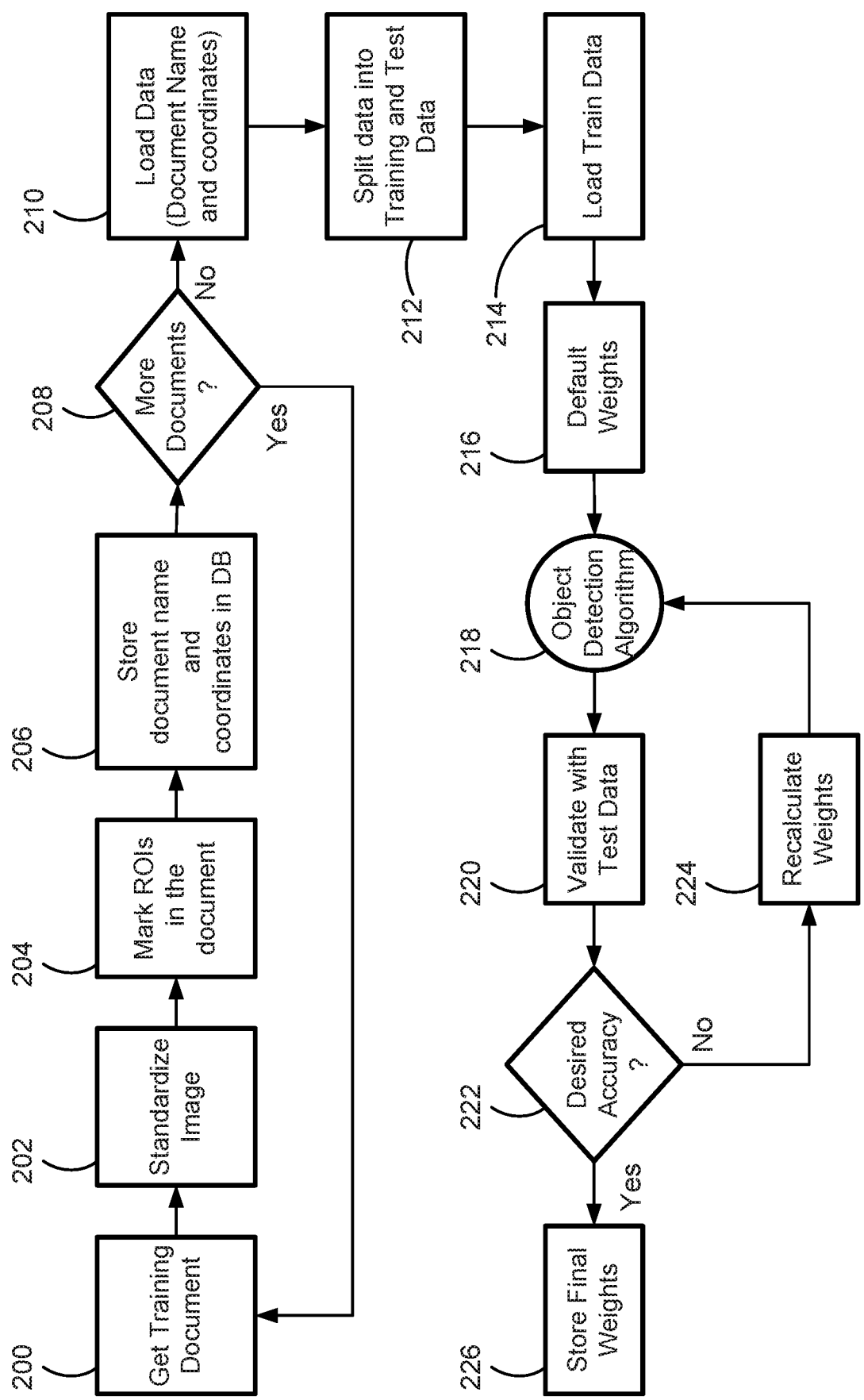
FIG. 2 is a flow diagram showing the process of learning relevant fields in a document.

FIG. 2 is a flow diagram showing the process of learning weights for different characteristics of regions if interest. The process is conducted by the document learning engine 116 in FIG. 1. The process is based on learning and weighting features of regions of interest from a collection of training documents 118. Such training documents may be different types of invoices with relevant information in different places on the documents. The machine learning engine 116 is taught how to identify regions of interest from such training documents and corresponding desired data that is in the region.

The routine begins by retrieving a training image document from the training set (200). The process first standardizes the image (202). The image is first converted to black and white. This ensures that we can consider the image as a set of pixels, with values from 0-255 (0 being completely black and 255 completely white). Then a pre-set threshold is apllied on the image so that all the pixels below a certain darkeness, say 120, is converted to 0 and everything above to 255. This standardization process strips the document of features like colours, greyness etc. and ensures that only the essential features remain in the image. The routine then marks the regions of interest in the document (204). This can be done a user interface system. A rectangle is drawn around the proposed ROI. The coordinates of this rectangle is then extracted. Each ROI is also lablled. The routine then stores the document name and coordinates of the regions of interest in the database 118 (206). The process then determines whether there are more documents in the training set of documents (208). If there are further documents, the routine loops back and gets the next training document (200).

If there are no further documents (206), the routine loads the data on the document name and the coordinates of the corresponding regions of interest it gathered (210). These are the details that are stored in database as a result of the previous operation. The routine splits the data into training data and text data (212). Of the total images, it randomly selects 30% of the data, and keeps it aside as test data. This data will be used to validate the training done and measure the accuracy. For example, if there are 100 images, the system will select thirty random images for testing. Training will be done only on the remaining seventy. This ensures that accuracy of the training can be done on documents which have not been trained. The process then loads the training data (214). The routine then begins by loading default weights to different features (216), like edges, corners, pixel patterns, white space etc. The routine then runs an object detection algorithm to detect different objects on a document that may be a region of interest (218). This object detection algorithm takes the regions of interest that has already been marked from training set. As mentioned earlier, weights are assigned and the accuracy is calculated. If the accuracy is low, the weights are recalculated and the process is repeated till the required accuracy is achieved. The algorithm then validates potential objects using the final weights with the test data (220).

The routine then checks whether a desired accuracy has been achieved by comparing the detected regions of interest with the regions of interest data from the training set of documents (224). If the desired accuracy has not been achieved, the routine readjusts the weights (226). The routine then reruns the object detection algorithm with the adjusted weights (218). If the process has the desired accuracy, the process stores the final weights for analysis of documents (228).

Figure 3:
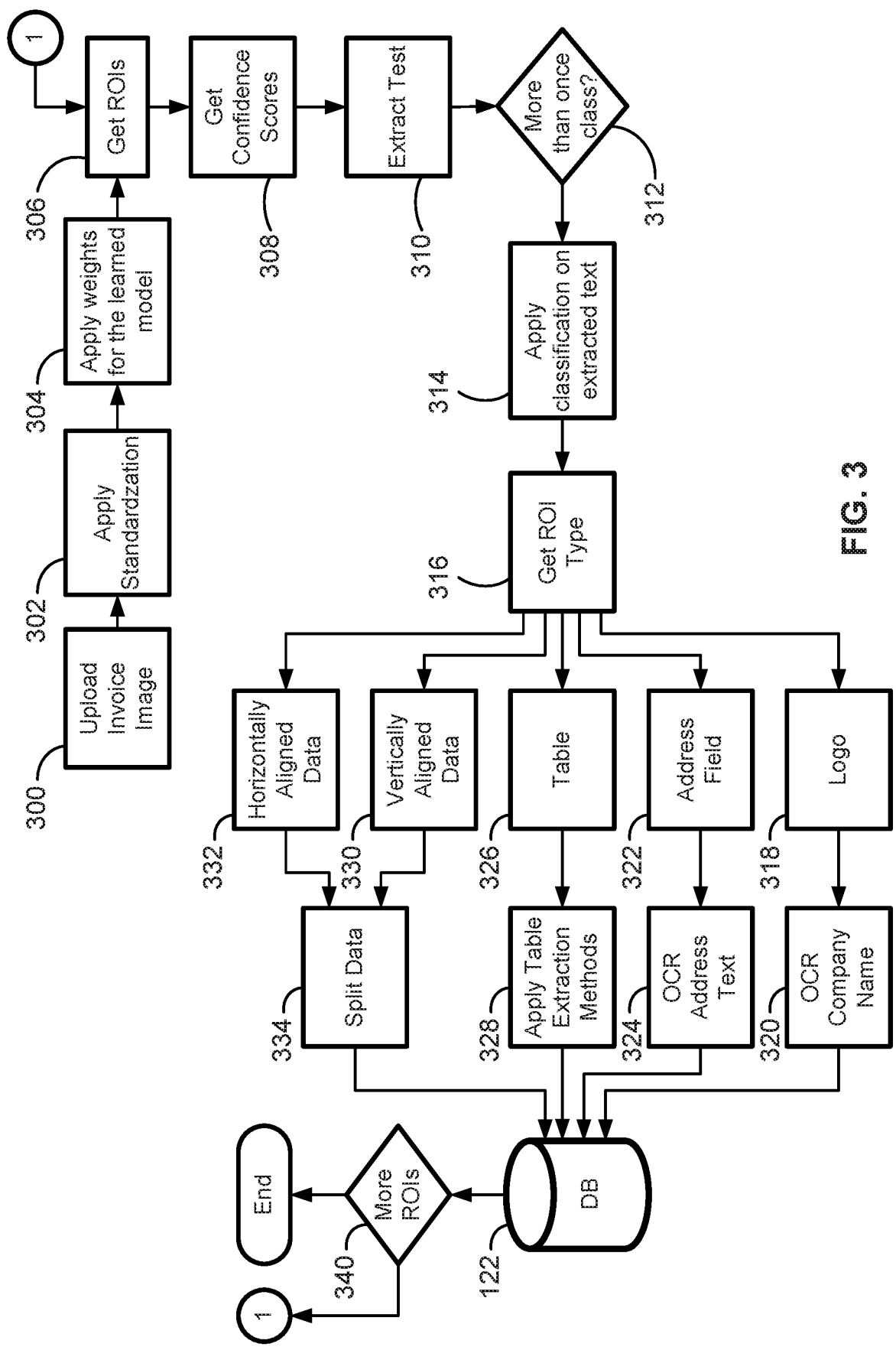
FIG. 3 is a flow diagram showing the process of extracting information from a document using learned relevant fields.

FIG. 3 is a flow diagram showing the process of gathering data from received documents such as invoices for the system 100 in FIG. 1 after a model of regions of interest has been learned. The process is executed for received images of invoices such as images output by the scanner 110 in FIG. 1. Thus, the process in FIG. 3 is repeated for each invoice received for extracting information and storing it in a format for other applications. The process in FIG. 3 may extract such data from multiple invoices having different formats.

The process first uploads an invoice image (300). The process then applies standardization to the received image (302). The weights for the learned models are applied (304). The process then divides the image into different regions and the weights are then applied to these regions. This will give a confidence score of the probability of that region being a 'region of interest' for a particular class. If there is more than one class, the process applies the classification on the extracted text from that region (314) to identify the final class of region of interest.

Each region of interest type has different learned features for identification of the region of interest. In this example there are five types of regions of interest, horizontally aligned data, vertically aligned data, a table, an address field and a logo. Each of the regions of interest have learned features that assist in its identification by the routine. The region of interest may have a special routine that is used to extract data in the region of interest.

In this example, a logo region may be identified (318). The logo region results in the OCR process determining the company name (320). The identified company name is then stored in the database 122 in FIG. 1. An address field region may be identified (322). The text in the region is then converted to the address data (324). The identified address data is then sorted in the database 122. A table region may be identified (326). Table extraction methods are applied to the table region to extract data from the tables. This will extract the column headers and column data from the table. (328). The data from the table is stored in the database 122. A vertically aligned data region may be identified (330). A horizontally aligned data region may be identified (332). Both the identified vertically aligned and horizontally aligned regions are and scanned for the text in them and split into key and value data (334). The extracted data from the vertically and horizontally aligned regions are then stored in the database (122). After the region of interest has been scanned and the data extracted and stored, the routine determines whether there are additional regions of interest on the document (340). If no further regions of interest are present, the routine ends. If there are additional regions of interest, the routine loops back and gets more regions of interest (306) and the above process is repeated to identify data in each of those regions of interest.

The difference between the document format in terms of where the regions of interest are on the document do not matter for purposes of data extraction in the system 100. The region of interest detection process takes small areas of the invoice and check if there is a region of interest pattern in that particular area. The regions of interest patterns are learned by the learning engine 116 via the learning routine in FIG. 2. If the identification routine identifies a pattern based on the weighted features it detects, it is marked as a region of interest on the document image. Due to this approach, the system 100 is able to avoid the effect of features such as type of invoices, invoice size, orientation, etc. that may distort or prevent successful data extraction. As the data extraction is done on small regions, size of the image, type of the image etc. does not affect the extraction technique.

A particular document type will have commonly extracted information. For example, commonly extracted information from an invoice may include Purchase Order Number, Order Date, Total Order Value, Vendor Address, Terms, Invoice Line Items, and Vendor Logo. The system 100 allows the conversion of such extracted information into an electronic searchable format in the database 124 for use with other applications. The disclosed process is general enough to identify any information from an invoice image that is a likely candidate for containing invoice information. It is to be understood that other types of documents may include other types of commonly extracted information.

Sometimes the same region of interest may be classified into multiple classes. For example, an address field can sometimes also be classified as a vertically aligned data class. The object detection algorithm will output confidence scores (probability) of the class labels on the region identified. In cases where there is a possibility of multiple classes being identified, this confidence score will be high for more than one class. In such cases, one more step is performed to identify the class. The text from this region is then classified to get a "second opinion". In this step, the extracted data is checked to see if it the format is of an address field or a vertically aligned text. This result is then used to finalize the output.

This identification of regions of interest is based only on the layout of the pixels which forms the text, so this approach can be applied on any document image (scanned, photographed, captured on a mobile device, etc.).

As explained above, the disclosed system 100 mimics human behavior when parsing an image of a document such as an invoice. The system 100 therefore identifies likely regions of interest based on the weighting factors learned by the learning engine 116. A human does not read the complete document when he is analyzing it. Instead, they will first identify the regions where the information lies. There are several clues that will help a human understand these regions, which are learned based on their past experience. Some of these clues include, but are not limited to, the layout of the text, boldness and italics, alignment of the text etc. For example, as a human being, there is a high probability that two short texts which are left aligned are related to one another. Similarly, these identification features may be learned by the learning engine and assigned a relative weighting. The combination of weighted detected features is then used to identify regions of interest in a document image.

In this example, the learning engine 116 of the system 100 is trained to follow human behavior in viewing a document image for desired information. For example, a sufficiently large number of invoices are marked with multiple areas as regions of interest in the training set 118. These marked invoices are then fed to the deep learning engine 116 with a neural network so that it can learn the patterns that define a region of interest in other types of invoices. Of course, such recognition may be learned for other types of documents as mentioned above.

The neural network of the learning engine 116 looks for patterns of objects in the regions of interest will help it predict the regions of interest in different documents of the same type such as invoices. With a sufficiently large number of training documents, the learned algorithm may identify patterns which define a region of interest on its own, much the same way as a human does. Once the learning engine 116 trains the identification algorithm, it is executed by the conversion engine 114.

Once the regions of interest are identified by the identification algorithm, an OCR process may be applied on the captured regions of interest. Since OCR is applied only on the very small captured regions of interest in a document image, spatial information will be preserved. The spatial information helps identify what is the key region and its associated value in the document. For example, applying OCR on a vertically aligned text will give us two lines of text, from which we can assume that the first line is key and second line is associated value. Once the OCR process is complete, various post-processing steps are performed that clean the output from the OCR. The post-processing steps may include spell check using pre-defined dictionaries to further refine the data. Once the cleaning is done, the result is presented as a convenient format such as JavaScript Object Notation (JSON) so that any downstream application can use it for further processing. We can plug this system into robotic process automation tools like UIPath or Blue Prism to automate invoice processing.

Figure 4A:
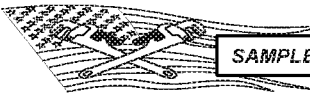
FIG. 4A is an image of an example invoice document that includes information that may be extracted efficiently from the system in FIG. 1.
Figure 4B:
FIG. 4B is an image of the invoice in FIG. 4A with regions of interest identified for scanning.

FIG. 4A is an image of an example invoice document 400 that includes information that may be extracted efficiently by the system 100 in FIG. 1. FIG. 4B is an image 450 of the invoice 400 in FIG. 4A with learned fields identified for scanning by the process. A source document is scanned as explained above to produce the document image 400 in FIG. 4A. The document 400 includes several areas that include information that may match commonly expected information in an invoice. A vendor logo 402 is shown at the top of the document image 400. A purchase order number 404 and a purchase order date 406 is shown at the top left of the document image 400. A company address 410 and a vendor address 412 are shown on the upper left of the document image 400. A shipping address 414 is shown in the upper right of the document image 400. A first table 420 includes various terms 422. Another table 430 in the center of the document image 400 shows a series of invoice line items 432 as well as a total order value 434.

Different regions of interest are identified as explained above. Examples of such identified regions of interest are shown in a processed image 450 that is produced based on the analysis of the image 400. As explained above, the process identifies different patterns that then are marked as a region of interest. The processed image 450 includes a series of horizontally aligned regions of interest 452, 454, 456, 458, 460, 462, 466, and 468 based on the layout of the pixels forming horizontal arrangement of the text. As shown in FIG. 4B compared with FIG. 4A, each of the horizontally aligned regions of interest include text data that may be captured by the OCR process. For example, the region of interest 452 is classified as the purchase order number based on the weighting factors applied from the learning engine e.g. image recognition of a number and the label "PO number.". To map 'PO number' to 'Purchase Order Number', we use various techniques like mapping tables.

The processed image 450 also includes vertically aligned regions of interest 470, 472, and 474 based on vertical arrangement of the pixels of the text. Each of the vertically aligned regions of interest 470, 472, and 474 include text data that may be captured by the OCR process. The text data is then classified based on mapping tables. For example, the vertical region of interest 470 includes the classification as a date requested data based on the weighting factors.

The processed image 450 includes a table region of interest 480 that is identified by the arrangement of pixels in a table. Address regions of interest 482, 484 and 486 are also identified on the processed image 450 based on the pixel arrangement as an address. Finally, a logo region of interest 490 is identified. As explained above, certain regions of interest may overlap. For example, the horizontal region of interest 462 overlaps with the address region of interest 486. The process will then assign a higher confidence score to the particular region.

FIG. 5A is an image 500 of a different example invoice document that may be processed by the system 100. The invoice represented by the image 500 includes information similar to that in the invoice of the image 400 in FIG. 4A that may be extracted efficiently by the system 100 in FIG. 1. The document image 500 in FIG. 5A is a different type of invoice than the image 400 in FIG. 4A with some similar information in regions of interest that are arranged in different areas of the document.

For example, the document image 500 includes a vendor logo 502 is shown at the top of the document image 500. A purchase order number 504 and a purchase order date 506 is shown at the top right of the document image 500, but in different order as the data in the image 400 in FIG. 4A. The initials of a requestor 508 are also shown in the top right of the image 500. A vendor address 512 is shown on the upper left of the document image 500. Unlike the invoice in the image 400, the invoice of the image 500 does not have a company address. A shipping address 514 is shown in the upper right of the document image 500. A stock name 516 is also shown below the shipping address 514. A job number 518 is shown in the top left of the image 500. A table 520 in the center of the document image 500 shows a series of invoice line items 522 as well as a subtotal, tax and total order value 524.

Figure 5B:
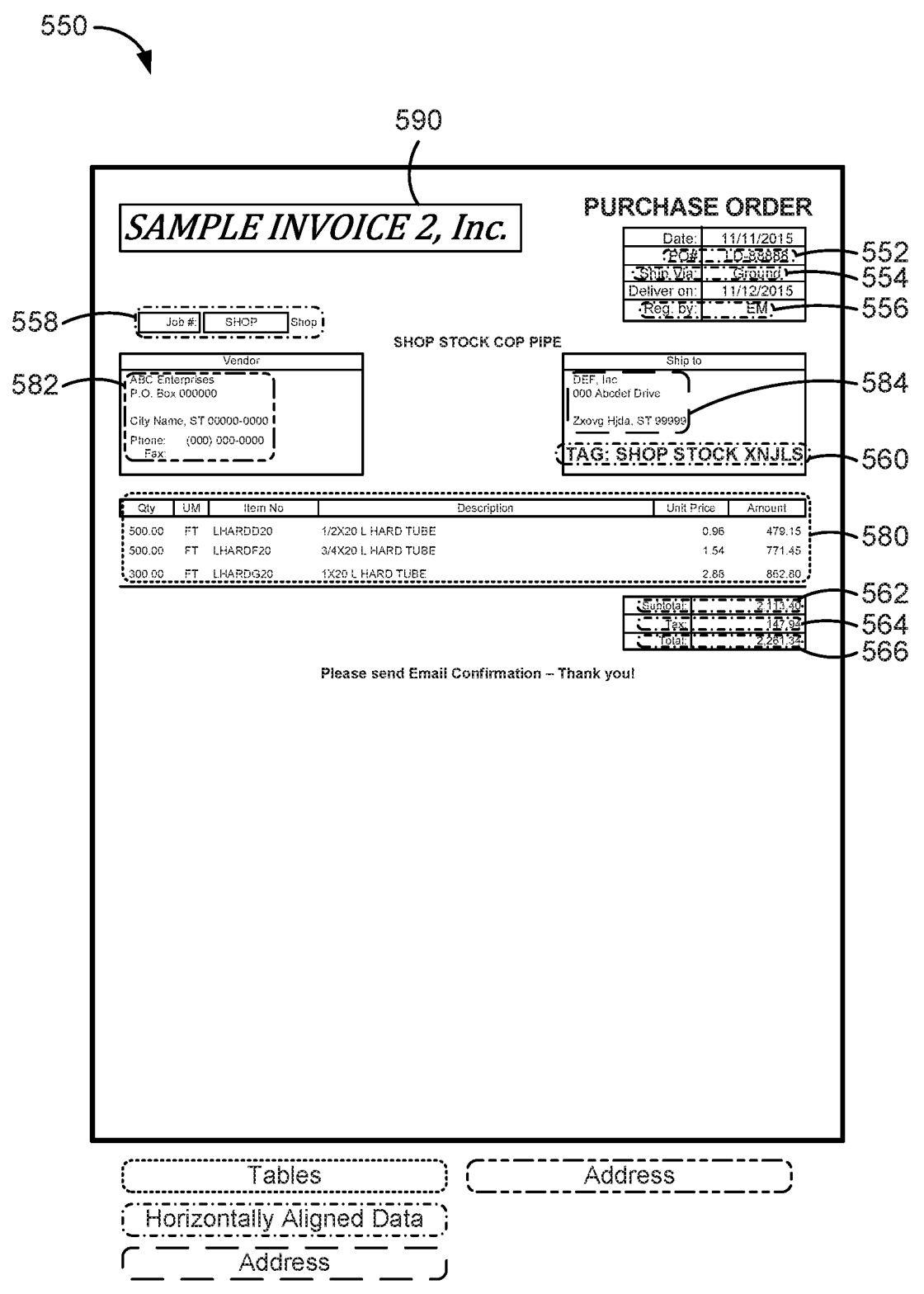

FIG. 5B is an image 550 of the invoice image 500 in FIG. 5A with regions of interest identified for scanning by the process as explained above. Different regions of interest are identified as explained above. Examples of such identified regions of interest are shown in a processed image 550 that is produced based on the analysis of the image 500. As explained above, the process identifies different patterns that then are marked as a region of interest. The processed image 550 includes a series of horizontally aligned regions of interest 552, 554, 556, 558, 560, 562, and 566 based on the layout of the pixels forming horizontal arrangement of the text. As shown in FIG. 5B compared with FIG. 5A, each of the horizontally aligned regions of interest include text data that may be captured by the OCR process. For example, the region of interest 552 is classified as the purchase order number based on the weighting factors applied from the learning engine e.g. image recognition of a number and the label "PO number.". "PO number" is identified as Purchase Order Number based on mapping tables.

The processed image 550 includes a table region of interest 580 that is identified by the arrangement of pixels in a table. Address regions of interest 582 and 584 are also identified on the processed image 550 based on the pixel arrangement as an address. Finally, a logo region of interest 590 is identified. The data from each of the additional regions of interest, 580, 582, 584, and 590 may be determined by the OCR process and the data may then be classified as explained above.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The computing device as mentioned in the application can include a set of instructions that can be executed to cause the computer system to perform any one or more of the methods disclosed. The computer system may operate as a stand-alone-device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system can also be implemented as or incorporated across various devices, such as a personal computer (PC), a tablet PC, a personal digital assistant (PDA), a mobile device, a palmtop computer, a laptop computer, a desktop computer, a communications device, a web appliance, a network router, switch or bridge, or any other machine capable of executing a set of instructions (sequential or otherwise) that specify actions to be taken by that machine. Further, while a single computer system is illustrated, the term "system" shall also be taken to include any collection of systems or sub-systems that individually or jointly execute a set, or multiple sets, of instructions to perform one or more computer functions.

The network as referred in the application may include wired networks, wireless networks, Ethernet AVB networks, or combinations thereof. The wireless network may be a cellular telephone network, an 802.11, 802.16, 802.20, 802.1Q or WiMax network. Further, the network may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Figure 6:
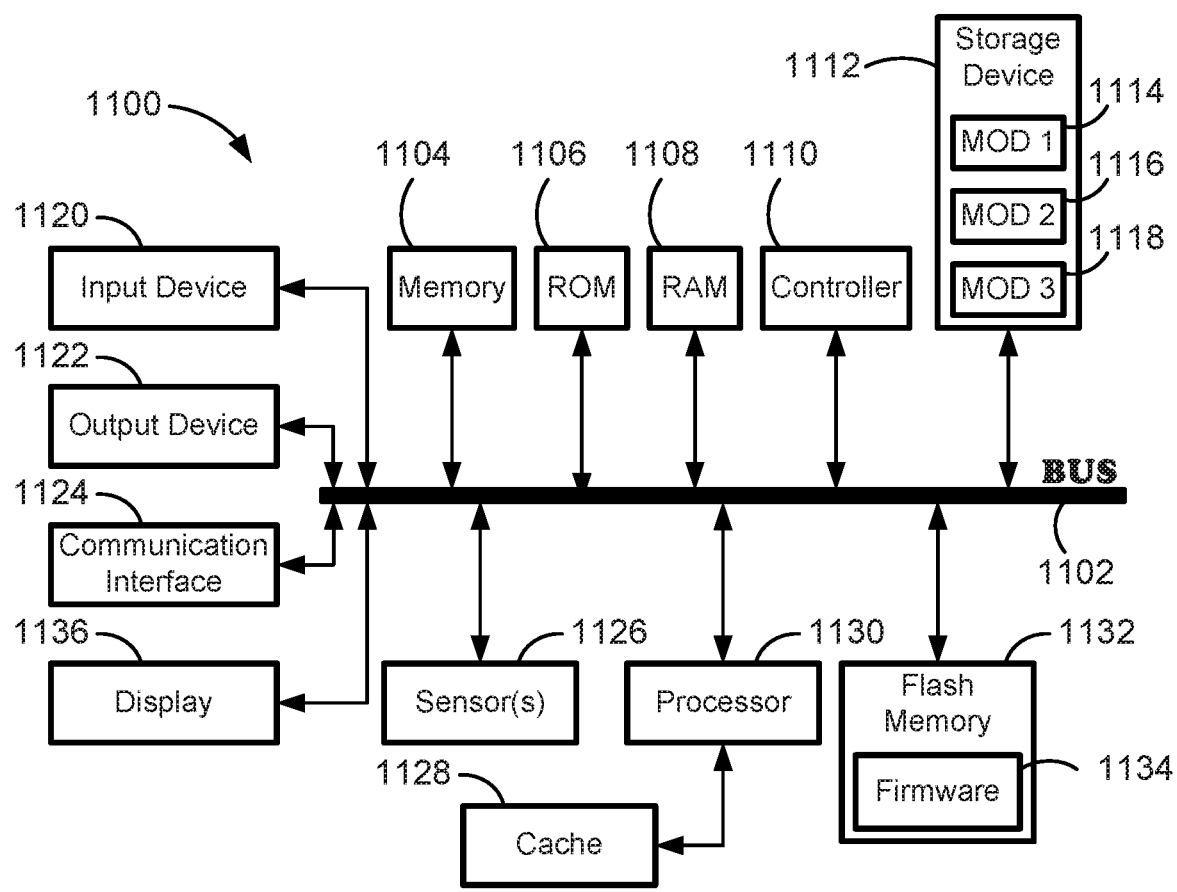
FIGS. 6-7 are block diagrams of example computing devices that may be used for the data extraction system.

FIG. 6 illustrates an example computing system 1100, in which the components of the computing system are in electrical communication with each other using a bus 1102. The system 1100 includes a processing unit (CPU or processor) 1130, and a system bus 1102 that couples various system components, including the system memory 1104 (e.g., read only memory (ROM) 1106 and random access memory (RAM) 1108), to the processor 1130. The system 1100 can include a cache of high-speed memory connected directly with, in close proximity to, or integrated as part of the processor 1130. The system 1100 can copy data from the memory 1104 and/or the storage device 1112 to the cache 1128 for quick access by the processor 1130. In this way, the cache can provide a performance boost for processor 1130 while waiting for data. These and other modules can control or be configured to control the processor 1130 to perform various actions. Other system memory 1104 may be available for use as well. The memory 1104 can include multiple different types of memory with different performance characteristics. The processor 1130 can include any general purpose processor and a hardware module or software module, such as module 1 1114, module 2 1116, and module 3 1118 embedded in storage device 1112. The hardware module or software module is configured to control the processor 1130, as well as a special-purpose processor where software instructions are incorporated into the actual processor design. The processor 1130 may essentially be a completely self-contained computing system, containing multiple cores or processors, a bus, memory controller, cache, etc. A multi-core processor may be symmetric or asymmetric.

To enable user interaction with the computing device 1100, an input device 1120 is provided as an input mechanism. The input device 1120 can comprise a microphone for speech, a touch-sensitive screen for gesture or graphical input, keyboard, mouse, motion input, and so forth. In some instances, multimodal systems can enable a user to provide multiple types of input to communicate with the system 1100. In this example, an output device 1122 is also provided. The communications interface 1124 can govern and manage the user input and system output.

Storage device 1112 can be a non-volatile memory to store data that are accessible by a computer. The storage device 1112 can be magnetic cassettes, flash memory cards, solid state memory devices, digital versatile disks, cartridges, random access memories (RAMs) 1208, read only memory (ROM) 1106, and hybrids thereof.

The controller 1110 can be a specialized microcontroller or processor on the system 1100, such as a BMC (baseboard management controller). In some cases, the controller 1110 can be part of an Intelligent Platform Management Interface (IPMI). Moreover, in some cases, the controller 1110 can be embedded on a motherboard or main circuit board of the system 1100. The controller 1110 can manage the interface between system management software and platform hardware. The controller 1110 can also communicate with various system devices and components (internal and/or external), such as controllers or peripheral components, as further described below.

The controller 1110 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 1110 can also include a system event log controller and/or storage for managing and maintaining events, alerts, and notifications received by the controller 1110. For example, the controller 1110 or a system event log controller can receive alerts or notifications from one or more devices and components, and maintain the alerts or notifications in a system event log storage component.

Flash memory 1132 can be an electronic non-volatile computer storage medium or chip that can be used by the system 1100 for storage and/or data transfer. The flash memory 1132 can be electrically erased and/or reprogrammed. Flash memory 1132 can include EPROM (erasable programmable read-only memory), EEPROM (electrically erasable programmable read-only memory), ROM, NVRAM, or CMOS (complementary metal-oxide semiconductor), for example. The flash memory 1132 can store the firmware 1134 executed by the system 1100 when the system 1100 is first powered on, along with a set of configurations specified for the firmware 1134. The flash memory 1132 can also store configurations used by the firmware 1134.

The firmware 1134 can include a Basic Input/Output System or equivalents, such as an EFI (Extensible Firmware Interface) or UEFI (Unified Extensible Firmware Interface). The firmware 1134 can be loaded and executed as a sequence program each time the system 1100 is started. The firmware 1134 can recognize, initialize, and test hardware present in the system 1200 based on the set of configurations. The firmware 1134 can perform a self-test, such as a POST (Power-on-Self-Test), on the system 1100. This self-test can test the functionality of various hardware components such as hard disk drives, optical reading devices, cooling devices, memory modules, expansion cards, and the like. The firmware 1134 can address and allocate an area in the memory 1104, ROM 1106, RAM 1108, and/or storage device 1112, to store an operating system (OS). The firmware 1134 can load a boot loader and/or OS, and give control of the system 1100 to the OS.

The firmware 1134 of the system 1100 can include a firmware configuration that defines how the firmware 1134 controls various hardware components in the system 1200. The firmware configuration can determine the order in which the various hardware components in the system 1100 are started. The firmware 1134 can provide an interface, such as an UEFI, that allows a variety of different parameters to be set, which can be different from parameters in a firmware default configuration. For example, a user (e.g., an administrator) can use the firmware 1134 to specify clock and bus speeds; define what peripherals are attached to the system 1100; set monitoring of health (e.g., fan speeds and CPU temperature limits); and/or provide a variety of other parameters that affect overall performance and power usage of the system 1100. While firmware 1134 is illustrated as being stored in the flash memory 1132, one of ordinary skill in the art will readily recognize that the firmware 1234 can be stored in other memory components, such as memory 1104 or ROM 1106.

System 1100 can include one or more sensors 1126. The one or more sensors 1126 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1126 can communicate with the processor, cache 1128, flash memory 1132, communications interface 1124, memory 1104, ROM 1106, RAM 1108, controller 1110, and storage device 1112, via the bus 1102, for example. The one or more sensors 1126 can also communicate with other components in the system via one or more different means, such as inter-integrated circuit (I2C), general purpose output (GPO), and the like. Different types of sensors (e.g., sensors 1126) on the system 1100 can also report to the controller 1110 on parameters, such as cooling fan speeds, power status, operating system (OS) status, hardware status, and so forth. A display 1136 may be used by the 1100 to provide graphics related to the applications that are executed by the controller 1110, or the processor 1130.

Figure 7:
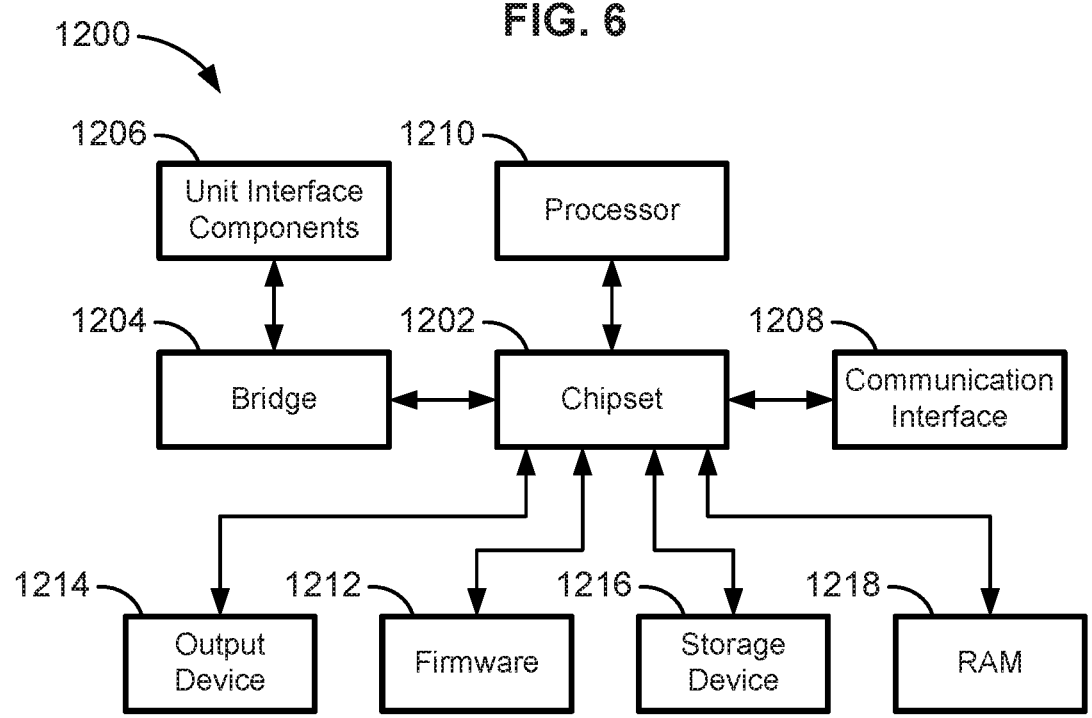

FIG. 7 illustrates an example computer system 1200 having a chipset architecture that can be used in executing the described method(s) or operations, and generating and displaying a graphical user interface (GUI). Computer system 1200 can include computer hardware, software, and firmware that can be used to implement the disclosed technology. System 1200 can include a processor 1210, representative of a variety of physically and/or logically distinct resources capable of executing software, firmware, and hardware configured to perform identified computations. Processor 1210 can communicate with a chipset 1202 that can control input to and output from processor 1210. In this example, chipset 1202 outputs information to output device 1214, such as a display, and can read and write information to storage device 1216. The storage device 1216 can include magnetic media, and solid state media, for example. Chipset 1202 can also read data from and write data to RAM 1218. A bridge 1204 for interfacing with a variety of user interface components 1206, can be provided for interfacing with chipset 1202. User interface components 1206 can include a keyboard, a microphone, touch detection and processing circuitry, and a pointing device, such as a mouse.

Chipset 1202 can also interface with one or more communication interfaces 1208 that can have different physical interfaces. Such communication interfaces can include interfaces for wired and wireless local area networks, for broadband wireless networks, and for personal area networks. Further, the machine can receive inputs from a user via user interface components 1206, and execute appropriate functions, such as browsing functions by interpreting these inputs using processor 1210.

Moreover, chipset 1202 can also communicate with firmware 1212, which can be executed by the computer system 1200 when powering on. The firmware 1212 can recognize, initialize, and test hardware present in the computer system 1300 based on a set of firmware configurations. The firmware 1212 can perform a self-test, such as a POST, on the system 1200. The self-test can test the functionality of the various hardware components 1202-1218. The firmware 1212 can address and allocate an area in the RAM memory 1218 to store an OS. The firmware 1212 can load a boot loader and/or OS, and give control of the system 1200 to the OS. In some cases, the firmware 1212 can communicate with the hardware components 1202-1210 and 1214-1218. Here, the firmware 1212 can communicate with the hardware components 1202-1210 and 1214-1218 through the chipset 1202, and/or through one or more other components. In some cases, the firmware 1212 can communicate directly with the hardware components 1202-1210 and 1214-1218.

It can be appreciated that example systems 1100 and 1200 can have more than one processor (e.g., 1130, 1210), or be part of a group or cluster of computing devices networked together to provide greater processing capability.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

I claim:

1. A system to extract data from regions of interest on a document, the system comprising:
    a storage device storing an image derived from a document having text information;
    a region of interest identification engine that scans the image and identifies at least one region of interest on the image;
    an optical character recognition module operable to convert image data in the region of interest to machine readable data; and
    a classification engine to classify the data obtained by the optical character recognition module from the region of interest,
    wherein the region of interest identification engine includes a plurality of types of regions of interest, each of the types of regions of interest having different learned weights to determine the type of region of interest.

2. The system of claim 1, further comprising a database coupled to the classification engine, wherein the database stores a record with the data obtained by the classification engine associated with the document.

3. The system of claim 2, wherein stored data is converted to JSON format.

4. The system of claim 1, wherein the document is an invoice.

5. The system of claim 1, wherein the image is obtained from a scanner or a photograph of the document.

6. The system of claim 1, wherein the region of interest identification engine uses a model of features having learned weights to identify the region of interest.

7. The system of claim 1, wherein the at least one region of interest includes one of horizontally aligned data, vertically aligned data, a table, an address field and a logo.

8. A method of extracting data from regions of interest from a document, the method comprising:
    creating an image of the document;
    storing the image of the document in a storage device;
    scanning the image of the document and identifying at least one region of interest from the image via a region of interest identification engine;
    converting image data in the identified region of interest to machine readable data via an optical character recognition module; and
    classifying the data obtained by the optical character recognition module via a classification engine, wherein the region of interest identification engine includes a plurality of types of regions of interest, each of the types of regions of interest having different learned weights to determine the type of region of interest.

9. The method of claim 8, further comprising storing a record associated with the document with the data obtained by the classification engine in a database.

10. The method of claim 9, wherein the stored data is converted to JSON format.

11. The method of claim 8, wherein the document is an invoice.

12. The method of claim 8, wherein the region of interest identification engine uses a model of features having learned weights to identify the region of interest.

13. The method of claim 8, wherein the at least one region of interest includes one of horizontally aligned data, vertically aligned data, a table, an address field and a logo.

14. The method of claim 8, wherein the image is created from a scanner or a photograph of the document or is in a portable document format.

\* \* \* \* \*